US008554885B2

(12) United States Patent
Isaacson et al.

(10) Patent No.: US 8,554,885 B2
(45) Date of Patent: Oct. 8, 2013

(54) TECHNIQUES FOR EVALUATING AND MANAGING CLOUD NETWORKS VIA POLITICAL AND NATURAL EVENTS

(75) Inventors: Scott Alan Isaacson, Woodland Hills, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 219 days.

(21) Appl. No.: 12/872,293

(22) Filed: Aug. 31, 2010

(65) Prior Publication Data
US 2011/0289198 A1    Nov. 24, 2011

Related U.S. Application Data

(63) Continuation-in-part of application No. 12/783,615, filed on May 20, 2010.

(51) Int. Cl.
*G06F 15/177* (2006.01)
(52) U.S. Cl.
USPC .......................................................... 709/221
(58) Field of Classification Search
None
See application file for complete search history.

(56) References Cited

U.S. PATENT DOCUMENTS

| 6,625,453 | B1 | 9/2003 | Dai et al. |
| 7,693,766 | B2 | 4/2010 | Horowitz |
| 7,783,543 | B2 | 8/2010 | Horowitz |
| 2008/0080396 | A1 | 4/2008 | Meijer et al. |
| 2008/0147866 | A1* | 6/2008 | Stolorz et al. ................. 709/226 |
| 2009/0300423 | A1 | 12/2009 | Ferris |
| 2009/0300608 | A1 | 12/2009 | Ferris et al. |
| 2010/0027552 | A1 | 2/2010 | Hill |
| 2010/0030866 | A1 | 2/2010 | Bedi |
| 2010/0061250 | A1 | 3/2010 | Nugent |
| 2010/0125664 | A1* | 5/2010 | Hadar et al. ................. 709/224 |
| 2010/0281151 | A1* | 11/2010 | Ramankutty et al. ......... 709/223 |
| 2011/0119370 | A1 | 5/2011 | Huang et al. |
| 2011/0138049 | A1 | 6/2011 | Dawson et al. |

* cited by examiner

*Primary Examiner* — Scott Christensen
(74) *Attorney, Agent, or Firm* — Schwegman, Lundberg & Woessner, P.A.

(57) ABSTRACT

Techniques for evaluating and managing cloud networks via political and natural events are provided. Geographical locations for cloud processing environments are combined with attributes and usage metrics to form associations between each cloud processing environment's geographical location and that cloud's corresponding attributes and usage metrics. Some associations and attributes relate to political and natural events. The political and natural events are used to update a proper selection of a particular cloud processing environment to handle targeted services.

19 Claims, 5 Drawing Sheets

TECHNIQUES FOR EVALUATING AND MANAGING CLOUD NETWORKS VIA POLITICAL AND NATURAL EVENTS

RELATED APPLICATIONS

The present application is a Continuation-In-Part of and claims priority to U.S. patent application Ser. No. 12/783,615, filed on May 20, 2010, and entitled: "Techniques for Evaluating and Managing Cloud Networks;" the disclosure of which is incorporated herein by reference in its entirety.

BACKGROUND

Enterprises are finding it increasingly difficult to stay abreast with the rapidly evolving technology platforms. That is, software and hardware upgrades are commonplace for an information technology (IT) infrastructure of an enterprise and maintaining a state of the art infrastructure is costly, time consuming, and distracts from the business of an enterprise. But, there is no avoiding technology and the enterprise's business is intimately dependent on its underlying infrastructure. So, an enterprise is in a catch-22 position and is forced to maintain a costly IT infrastructure.

To remedy these concerns a new technology has been gaining acceptance in the industry. This technology is referred to as "cloud computing." The term "cloud" is used as a metaphor for how the Internet is depicted in diagrams and is used as an abstraction of the underlying infrastructure, which is being concealed with cloud computing. Cloud computing is often defined as computing capabilities that provide an abstraction between computing resources and the underlying technical architecture (e.g., servers, storage, networks), enabling convenient, on-demand network access to a shared pool of configurable computing resources that can be rapidly provisioned and released with minimal management effort or service provider interaction.

With cloud computing and cloud storage, enterprises are recognizing an economy of scale in migrating portions of their data centers to various cloud providers. Infrastructure as a Service (IaaS) is currently the most common mechanism for providing cloud computing and storage. Software as a Service (SaaS) and Platform as a Service (PaaS) are focused more on providing specific services or specific platform services rather than raw infrastructure.

One of the concerns that the cloud services provider are likely to face as cloud services and cloud infrastructure become more important to enterprise users is the issue of service-level agreements (SLA's). Anyone paying for a service has an expectation that the service will be operated so as to meet their needs. These needs not only include security and stability but also include responsiveness and accessibility. Typically, responsiveness is directly related to the location of the end user and the cloud services that the end-user will be utilizing.

While geography plays a part in this, more important is the state of a network in relation to the user and the cloud services. So, because of the way the network is set up, processes may be more advantageously located (for responsiveness) in locations that are not geographically close. Furthermore, because of the nature of the Internet and the anticipated cloud service providers operating on the Internet, it is important to not only acquire the state of the network in relation to geography but also to maintain that state so that it is constantly up to date. This type of maintenance of the network state will become more important as more and more cloud services providers instantiate clouds in different geographic locations so as to provide more responsive services to their customers, disaster recovery, etc.

SUMMARY

In various embodiments, techniques for evaluating and managing cloud networks via political and natural events are presented. More specifically, and in an embodiment, a method for evaluating and managing a cloud network via political and natural events is provided. Specifically, a state is acquired for a cloud processing environment, which was tested with test data. The state represents an association between geographical data for the cloud processing environment, attribute data for the cloud processing environment, and previously obtained metric usage data acquired from testing the cloud processing environment via the test data. Next, the state is updated with natural event data and political event data associated with the geographical data. Finally, the updated state is used for making real-time decisions for services associated with the cloud processing environment.

DETAILED DESCRIPTION

Figure 1:
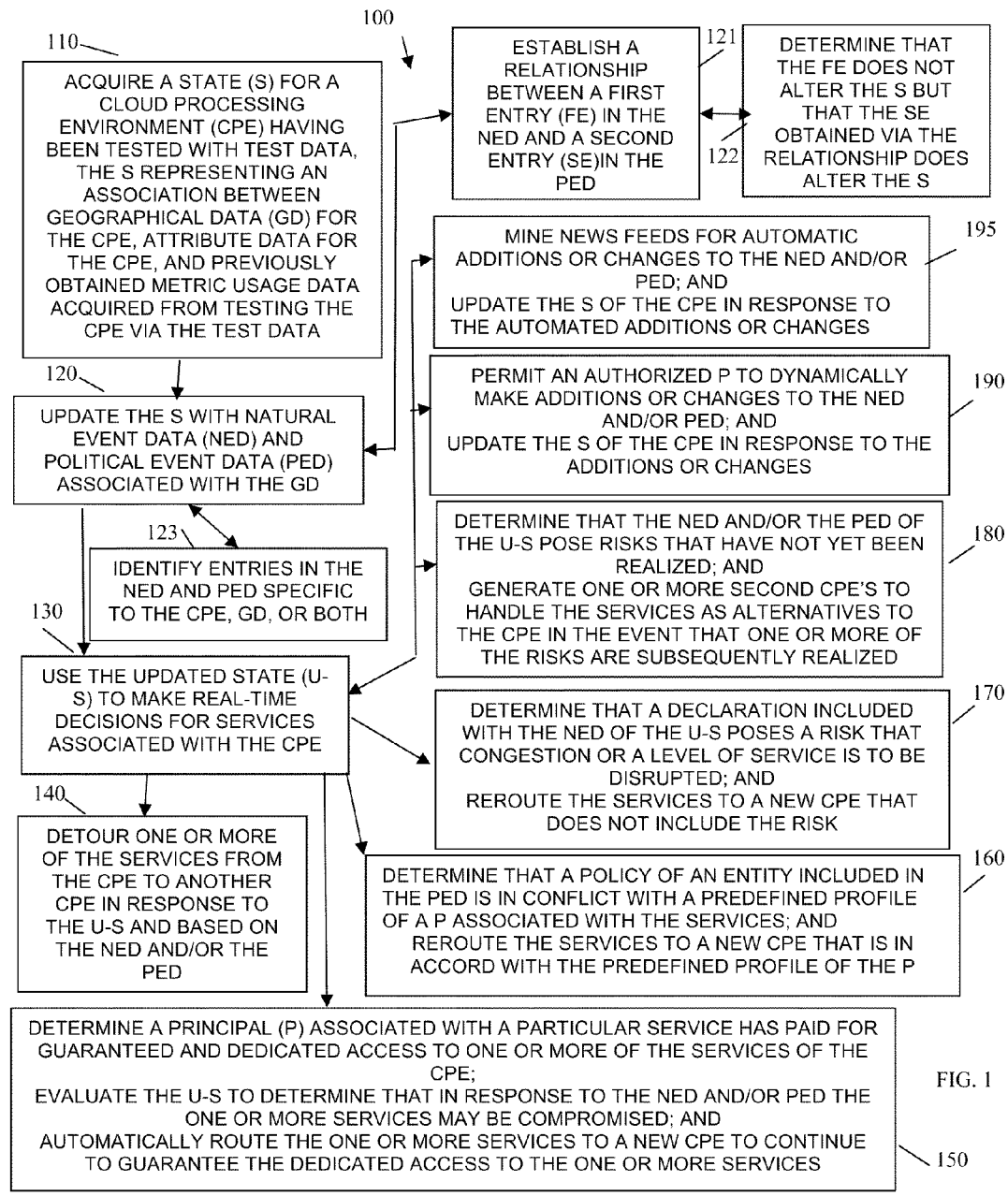
FIG. 1 is a diagram of a method for evaluating and managing a cloud network via political and natural events, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines, storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

The phrase "cloud network" refers to a network of cloud processing environments logically being managed as a single collective network.

The term "Netgraphy" is used herein to indicate the state of a cloud network, such that messages and packets traveling between processes, storage, and end users can be affected, monitored, and altered.

The phrase "Political Event" (PE) refers to descriptions of governmental or societal situations occurring based on geography. So, the war in Afghanistan is a political event and is news that an enterprise associated with cloud networks or services is filing for bankruptcy. In fact, any current event that may impact cloud services in some manner may be defined as a PE.

The phrase "Natural Event" (NE) refers to weather, disasters, or any other physical situation that impacts or has the potential to impact cloud resources in a geographical area associated with a NE.

NE's are descriptive of what is physically happening outside of human control, like a major earthquake in Southern California. Conversely, PE's are declarative and interpretative of human language policy and semantics. That is, PE's are ultimately controllable by humans, created by humans, and promulgated by humans.

Various embodiments of this invention can be implemented in existing network architectures. For example, in some embodiments, the techniques presented herein are implemented in whole or in part in the Novell® network and proxy server products, operating system products, cloud-based products or services, directory-based products and other products and/or services distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory and computer-readable or processor-readable storage media and processed on the machines (processing devices) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-5.

FIG. 1 is a diagram of a method 100 for evaluating and managing a cloud network via political and natural events, according to an example embodiment. The method 100 (hereinafter "cloud network manager") is implemented in a machine-accessible and computer-readable medium and instructions that execute on one or more processors (machines, computers, processors, etc.). The machine is specifically configured to process the cloud network manager. Furthermore, the cloud network manager is operational over and processes within a network. The network may be wired, wireless, or a combination of wired and wireless.

At 110, the cloud network manager acquires a state for a cloud processing environment. The cloud processing environment was previously tested with test data. The state represents an association between geographical data for the cloud processing environment, attribute data for the cloud processing environment, and previously obtained metric usage data acquired from testing the cloud processing environment via the test data. This processing was defined in U.S. Ser. No. 12,783,685, which was incorporated by reference herein. Moreover, this application is a continuation-in part of said U.S. Ser. No. 12,783,685.

At 120, the cloud network manager updates the state with natural event data and with political event data that is tied to or associated with the geographical data. Again, natural event data represents descriptions of events outside the control of humans, such as a solar storm, a volcanic eruption, an earthquake, a flood, a thunderstorm, a tornado, and the like. The natural event data is tied to resources of the cloud processing environment, to a geographic location of the cloud processing environment, or tied to both the resources of the cloud processing environment and the geographical location (defined in the geographical data along with other data related to geography). Political event data is related to statements and actions of governments and entities, such as boycotts, threatened military action, taxes, search and seizure programs, confiscation programs, censorship programs, and the like. Again, the political event data is tied to resources of the cloud processing environment, to a geographical location (defined with other things in the geographical data), or tied to both the resources of the cloud processing environment and the geographic location.

According to an embodiment, at 121, the cloud network manager establishes a relationship between a first entry in the natural event data and a second entry defined in the political event data. That is, a linkage between entries in one set of data is made to other entries in the other set of data. The relationships can be one-to-one, one-to-many, or many-to-many.

Continuing with the embodiment of 121 and at 122, the cloud network manager determines that the first entry does not alter the state but that the second entry obtained via the relationship does alter the state. So, state may not change based on entries in the natural event data but when linked to the political event data, the state may change. Policy evaluation will drive the decisions and policy is associated with each entry, groups of entries, or a combination of both individual entries and groups of entries.

In another situation, at 123, the cloud network manager identifies some entries in both the natural event data and the political event data that are: specific to a geographical location or region for the resources of the cloud processing environment, specific to just the cloud processing environment, or specific to both the cloud computing environment and the geographic location or region. Thus, entries in the natural event data and the political event data can be specific to the cloud, the geographic region, or specific to both these things.

At 130, the cloud network manager uses the updated state to make real-time and dynamic decision for services associated with or being deployed to the cloud processing environment. Here, the existing cloud processing environment can be rerouted or bypassed based on the decisions.

It is noted that the term "rerouted" as used herein can also include relocating (moving) an entire cloud processing environment from one geographical location to another geographical location or relocating specific resources of a given cloud processing environment from one geographical location to another geographical location.

According to an embodiment, at 140, the cloud network manager detours one or more services from being deployed in the cloud processing environment to another different cloud processing environment in response to the updated state and based on the natural event data and/or the political event data.

In one scenario, at 150, the cloud network manager determines that a principal associated with a particular service has paid for guaranteed and dedicated access to one or more of the services of the cloud processing environment. This drives a re-evaluation of the updated state to determine that in response to the natural event data and/or the political event data, the one or more services guaranteed to the principal may be compromised. Next, the cloud network manager automatically routes the one or more services to a new cloud processing environment to continue with the guaranteed and dedicated access to the one or more services as agreed to. This ensures compliance with the service agreement with the principal by anticipating issues with the services that the principal desires based on the natural event data and/or political event data.

In another case, at 160, the cloud network manager determines that a policy of an entity included in the political event data is in conflict with a predefined profile of a principal associated with the services. So, in response, the cloud network manager reroutes the services to a new cloud processing environment that is in accord with the predefined profile of the principal. For instance, the principal may be a user that is morally opposed to countries with human rights' violations and the cloud processing environment may have migrated to such a country's server. This along with other scenarios can be accounted for with the teachings presented herein.

In yet another embodiment, at 170, the cloud network manager determines that a declaration included with the natural event data of the updated state poses a risk that congestion or a degraded level of service is to be disruptive to a principal of the service. In response, the cloud network manager reroutes the services to a new cloud processing environment that does not include the risk. So, risk management can occur as well. In fact, analytics can be used and threshold values when evaluating policies included with the natural event data and the political event data to trigger when a risk warrants migration to a new cloud processing environment. Essentially prophylactic reroutes occur based on risk assessment.

In similar scenario, at 180, the cloud network manager determines that the natural event data and/or the political event data of the updated state pose risks that have not yet been realized. In response, the cloud network manager generates one or more second cloud processing environments to handle the services as alternatives to the cloud processing environment in the event that one or more of the risks are subsequently realized. Here, the alternative cloud processing environments are used if the risks are realized, in the prior example at 170; alternative cloud processing environments were used before risks were realized.

In another situation, at 190, the cloud network manager permits an authorized principal (such as an administrator) to make additions and/or changes to the natural event data and/or the political event data. This is facilitated via an interface that the principal manually accesses to make the additions or changes. In response, the cloud network manager updates the state of the cloud processing environment again to reflect the changes and/or additions.

In an embodiment, at 195, the cloud network manager mines news feeds for automatic additions or changes to the natural event data and/or political event data. In response to the mining, the cloud network manager updates the state of the cloud processing environment automatically and dynamically to reflect the additions and/or changes. For example, a news feed can provide an indication that a country is rioting to overthrow a government where cloud resources are being utilized. The usage of keywords combined with mining reliable news feeds can trigger a policy to migrate principals to other cloud environments having the desired cloud resources.

Figure 2:
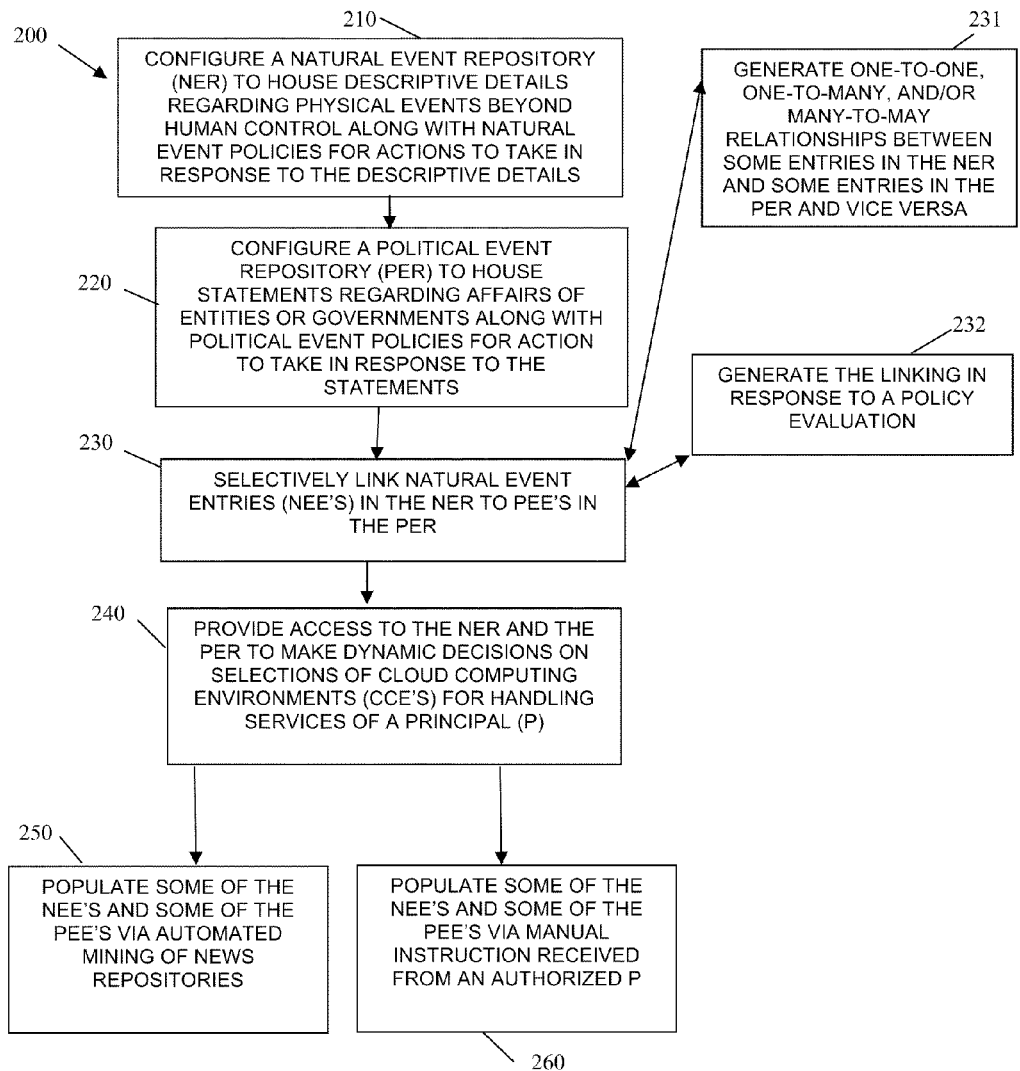
FIG. 2 is a diagram of another method for evaluating and managing a cloud network via political and natural events, according to an example embodiment.

FIG. 2 is a diagram of another method 200 for evaluating and managing a cloud network via political and natural events, according to an example embodiment. The method 200 (hereinafter "cloud evaluator") is implemented in a machine-accessible and computer-readable storage medium as instructions that execute on one or more processors of a network node. The cloud evaluator is operational over a network. The network may be wired, wireless, or a combination of wired and wireless. Furthermore, the processor is specifically configured to process the cloud evaluator.

At 210, the cloud evaluator configures a natural event repository to house descriptive details regarding physical events beyond human control along with natural event policies for actions to take in response to the descriptive details. Here, an entry may say tornado devastates Oklahoma City and a code may be assigned that maps to a policy and the policy says migrate cloud processing environments and resources to geographical locations away from the affected area. Entries may also include reputable forecasts, such as hurricane path projections, tornado warnings, tornado watches, and the like. In fact, any reliable forecast can be relied upon and included in the entries of the natural event repository.

Similarly, at 220, the cloud evaluator configures a political event repository to house statements regarding affairs of entities or governments along with political event policies for action to take in response to the statements. For example, an entry may say: Chinese government announces new law to censure all network activity on processing devices and storage devices within China, this may map to a policy that says migrate any private or sensitive data out of China-based clouds to a more favorable environment without censorship. Again, the political event repository can include reputable forecasts, such as a projection that a certain political party that wants to implement adverse policies to resources of a cloud processing environment is going to win an election for a certain government, and the like. So, any political forecast that is believed to be reliable can be included in the political event repository.

At 230, the cloud evaluator selectively links natural event entries in the natural event repository to political event entries in the political event repository. These relationships were discussed above with reference to the method 100 of the FIG. 1 and the processing discussed at 121-123.

According to an embodiment, at 231, the cloud evaluator generates at least one or more natural event entries that link to: a specific political event entry or two or more political event entries. Conversely, the cloud evaluator generates at least one or more political event entries that link to: a specific natural event entry or two or more natural event entries.

In another case, at 232, the cloud evaluator generates the linking in response to a policy evaluation. So, policy drives the relationships and linkages between the natural event repository and the political event repository.

At 240, the cloud evaluator provides access to the natural event repository and the policy event repository to make dynamic decision on selections of cloud computing environments for handling services of a principal. The types of decisions and mechanisms for decisions were discussed above with reference to the method 100 of the FIG. 1.

In an embodiment, at 250, the cloud evaluator populates some of the natural event entries and some of the political event entries via automated mining of news repositories.

In another case, at 260, the cloud evaluator populates some of the natural event entries and some of the political event entries via manual instruction received from an authorized principal.

Figure 3:
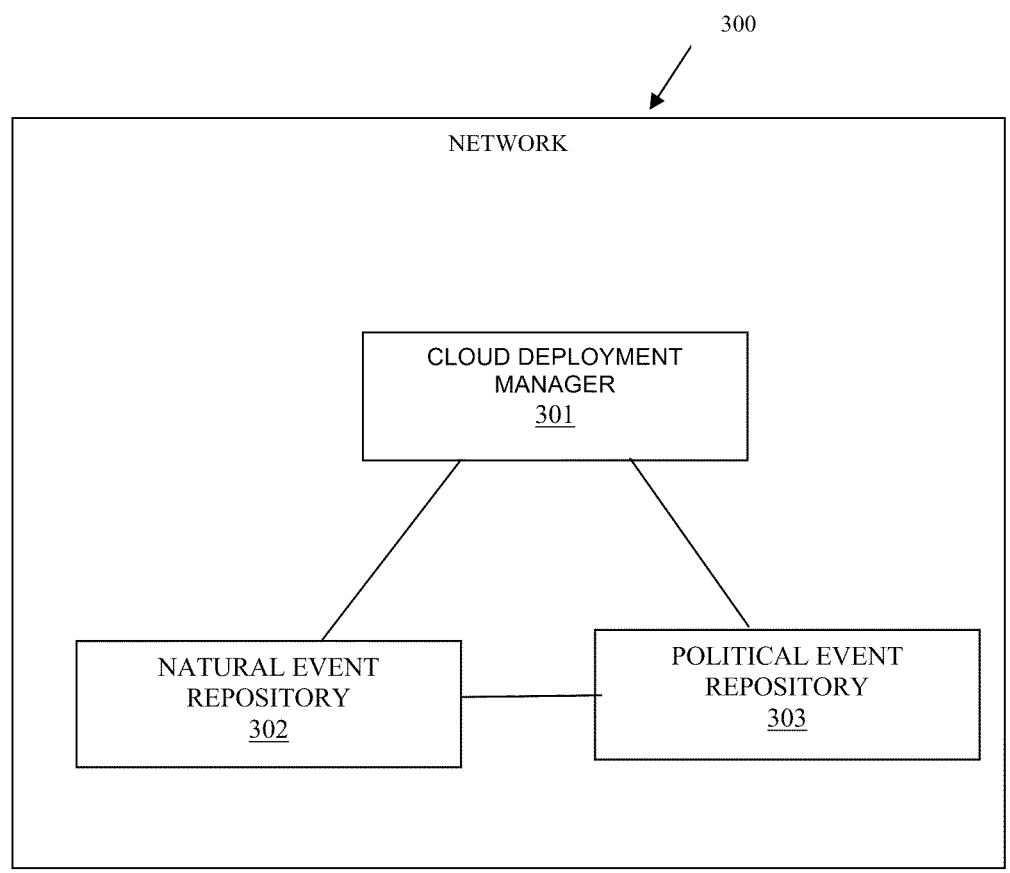
FIG. 3 is a diagram of a cloud network evaluation and management system, according to an example embodiment.

FIG. 3 is a diagram of a cloud network evaluation and management system 300, according to an example embodiment. The cloud network evaluation and management system 300 is implemented in a machine-accessible and computer-readable storage medium as instructions that execute on one or more processors (multiprocessor) and that is operational over a network. The one or more processors are specifically configured to process the components of the cloud network evaluation and management system 300. Moreover, the network may be wired, wireless, or a combination of wired and wireless. In an embodiment, the cloud network evaluation and management system 300 implements, among other things, certain aspects of the methods 100 and 200 represented by the FIGS. 1 and 2, respectively.

The cloud network evaluation and management system 300 includes a cloud deployment manager 301, a natural event repository 302, and a political event repository 303. Each of these and their interactions with one another will now be discussed in turn.

The cloud deployment manager 301 is implemented in a non-transitory computer-readable storage medium and executes one or more processors of the network. Example aspects of the cloud deployment manager 301 were presented above with reference to the methods 100 and 200 of the FIGS. 1 and 2, respectively.

The cloud deployment manager 301 is configured to evaluate entries in the natural event repository 302 and the political event repository 303 for purposes of updating a state associated with a target cloud processing environment. The cloud deployment manager 301 is also configured to reroute services from the target cloud processing environment to one or more alternative cloud processing environments in response to evaluation of the entries.

The natural event repository 302 is implemented in a non-transitory computer-readable storage medium and is accessible to one or more processors of the network. Aspects of the natural event repository 302 were discussed above with reference to the methods 100 and 200 of the FIGS. 1 and 2, respectively.

Descriptions of geographical events that are beyond the control of humans are detailed in the natural event repository 302. Each entry includes a description of geographical event, a code that maps to an event type and a policy identifier. The policy provides actions to perform based on the detected event type.

The political event repository 303 is implemented in a non-transitory computer-readable storage medium and is accessible to one or more processors of the network. Aspects of the political event repository 303 were discussed above with reference to the methods 100 and 200 of the FIGS. 1 and 2, respectively.

The entries of the political event repository 303 include statements of entities or governments; each entry in the political event repository is associated with its own policy for performing some recommended action.

According to an embodiment, at least some entries in the natural event repository 302 are linked to one or more entries in the political event repository 303. This establishes relationships between the two repositories as discussed in detail above.

Figure 4:
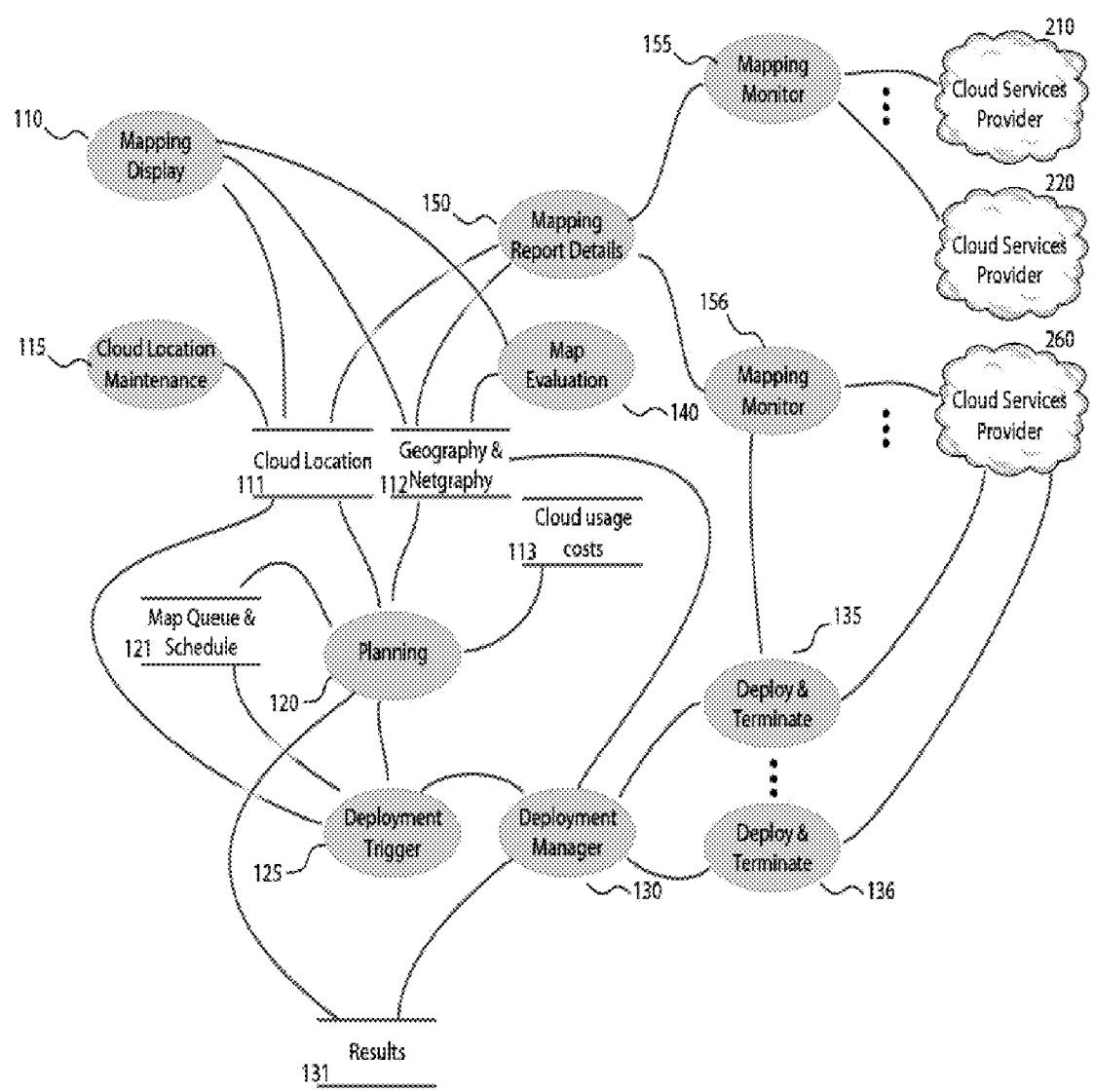
FIG. 4 is a diagram of a cloud architecture that uses the techniques presented herein.

FIG. 4 is a diagram of a cloud architecture that uses the techniques presented herein. The components of the FIG. 4 are implemented in a non-transitory computer-readable or processor-readable storage medium and execute on one or more processors specifically configured to perform the techniques discussed herein and below.

The techniques provide herein above and below provide for:

1. Detours: Due to routing problems, denial of service attacks, failures, workloads move from between various cloud resources;

2. Reserved/Guaranteed resources: pay for dedicated resources, scheduling, bandwidth, or routes;

3. Policy Changes: providers outside of the US are subject to foreign government data access laws that may or may not conflict with customer goals;

4. Congestion: allow for external declarations outside of what can be tested; and 5. New and changing resources: as Netgraphy interacts with geography, new routes and combinations are provided.

Embodiments of the FIG. 4 proceed as follows.

An additional "Political Events" (PE) persistent information store and administrative and user interface that allows external entities to add information that might affect the monitoring and management of cloud networks. The user interface allows users to list, add, delete, or modify entries. Entries describe which and why certain conditions exist and for how long. Entries can be specific to a cloud network or a geographic region or both or many combinations of these. Administrative interfaces allow for authorization and access controls of the information store with ultimate rights to override or remove user actions or data.

An additional "Natural Events" (NE) persistent information store similar to what is described above.

The PE and NE stores are both declarative, but the PE store is interpretative of human language policy and semantics while the NE store is more descriptive of what is currently (or soon to be—forecasted) physically happening outside of human control. For example, the ash cloud from the Iceland volcano eruption in 2010 is an example of an NE. It was a situation in which there was no ability for any human to have affected or changed that event in any way. However, there was a human-developed policy associated with that NE, which declared that many airports within a certain range of the ash cloud should be closed, and they were. The closing of the airports is an example of a PE. However, not all closures of transportation hubs are PEs. For example, in the devastating 2010 Haiti earthquake, many airports, freeways, and bus terminals were damaged or destroyed. In this case, the NE was responsible for the closure of the transportation facilities independent of any PE describing policies about whether or not they should be closed.

Techniques herein provide for relationships between entries in the NE and the PE that might be one-to-none, many-to-none, one-to-one, one-to-many, or many-to-many in either direction.

For example, a NE entry in the NE store can describe a satellite that is damaged and cannot be used for normal communication operations. After some analysis has been done, the NE entry can be updated to show when the satellite might be back up and operational for use. However, a PE entry in the PE store can also reference the updated NE entry that says traffic X might be routed to another satellite, but traffic Y should not be rerouted because that second satellite is not trusted.

A PE entry can state that no data from sources A or B should be stored on cloud storage resources C or D due to legal search and seizure concerns from the governments that own C and D.

An NE entry can describe why a router failure has happened.

PE entries can be formalized versions of cloud service providers rules and restrictions.

NE entries can also show planned outages that are not discoverable via testing.

Elements like 120 Planning, 125 Deployment Trigger, 120 Deployment Manager, all use information from the NE and the PE store to make their decisions and take their actions.

All PE and NE entries can optionally contain time stamp information that describes when the event happened or is expected to happen and how long the event lasted or is expected to last. These time values might be singular or plural. Time values might also be intervals, regular or arbitrary. Time values might be exact, approximate, or averages of multiple disparate values. Time values can be marked as immutable or dynamic.

An embodiment of the invention provides for a cloud location description at 111 to be entered via some mechanism such as is shown at 115 (this could come either from manual entry or from an automated process). Also access mechanisms, Internet Protocol (IP) addresses, Application Programming Interface (API) metadata, etc. are maintained in 111 via 115 so that the Netgraphy of the various clouds is ascertained.

The planning process of 120 accesses the information at 111 and, for new locations, prepares initial records at 112 for the correlation of geography and Netgraphy along with the accompanying responsiveness metrics for the Netgraphy. Other information may also be logged concerning the Netgraphy such as cloud usage costs, cloud ownership, common access mechanisms (such as standard router configurations), and enhanced access mechanisms (such as a subscription-based router configuration that would provide higher speed network access). The planning mechanism at 120 plans the sequencing of the testing of the cloud location based on the information in 113, which provides cloud usage costs, any previous information and 112, and any pending scheduled processes for ascertaining Netgraphy at 121. In an embodiment, it is foreseeable that some cloud providers in 113 will have entered into an agreement with the enterprises acquiring and maintaining the Netgraphy so as to provide a zero cost access to clouds supported by the specific cloud provider in return for the sharing of Netgraphy information. In other embodiments, the access to Netgraphy information would be by subscription so that the costs realized by obtaining the Netgraphy information can be offset as per information and 113.

The deployment trigger process at 125 uses the information at 121 to communicate with deployment manager at 130 so that Netgraphy agents can be deployed to the various cloud services providers so that active elements can be in place at the cloud services providers to respond to test traffic to ascertain the Netgraphy. The process at 125 may receive a trigger from 111 or 115 as information is entered into the cloud location as either a modification or new cloud location information. Likewise, in an embodiment trigger information is provided by the planning function 121 the schedule at 121 is completed. The planning module at 120 also uses results from previous Netgraphy agents at 131 to determine the appropriate scheduling. This is especially useful if the results in 131 are showing failures as a result of certain access problems, such as problems with IP addresses. In this case the planning module would request information externally for the correction of the erroneous information (e.g., the IP address), which would then be corrected via 115 in 111.

The deployment trigger then spawns the deployment manager or notifies the deployment manager at 130, which then makes requests of the deploy and terminate modules at 135 and 136. The modules at 135 and 136 represent a plurality of processes that are written specific to the API or deployment mechanisms for certain cloud providers such as 210, 220, and 260. As Netgraphy agents are deployed, information is sent from 135 and 136 to 156 to allow the monitoring of those agents in the reporting of the monitoring information from 156 to 150. This monitoring is provided in an embodiment to allow operations personnel to verify the correct processing of Netgraphy agents.

As Netgraphy agents complete determination information is received by 135 and 136 and reported back to 130, which is login 131. The deployment manager at 130 and the planning module 120 both can conduct evaluations to log appropriate information in 112 so that the correlation between geography and Netgraphy along with the responsiveness of the Netgraphy access can be noted. In an embodiment, the raw a results of 131 are also available for other types of analysis such as statistical analysis, which would allow the development of other router configurations, which may provide more advantageous cloud infrastructures.

The map evaluation process at 140 is accessing the geography of Netgraphy information 112 to provide final evaluation of the geography in relation to the Netgraphy. This evaluation is stored back in 112 and is available as the summarized or evaluated information concerning the entire Netgraphy agent reporting. This map evaluation may be displayed on a map displayed in one embodiment at 110 via either information from 140 or 112.

In an embodiment matching report details from the matching monitors are provided to 111 and 112 so as to provide information between the deployment and termination of a Netgraphy agent running at a cloud provider such as at 210, 220, and 260. It is well to note that there is a plurality of cloud services providers and that the three is used only as a convenient number for discussion.

The final mapping display at 110 could provide cloud location information, geography information, and Netgraphy information in a variety of display format both pictorially and in a tabular format.

Figure 5:
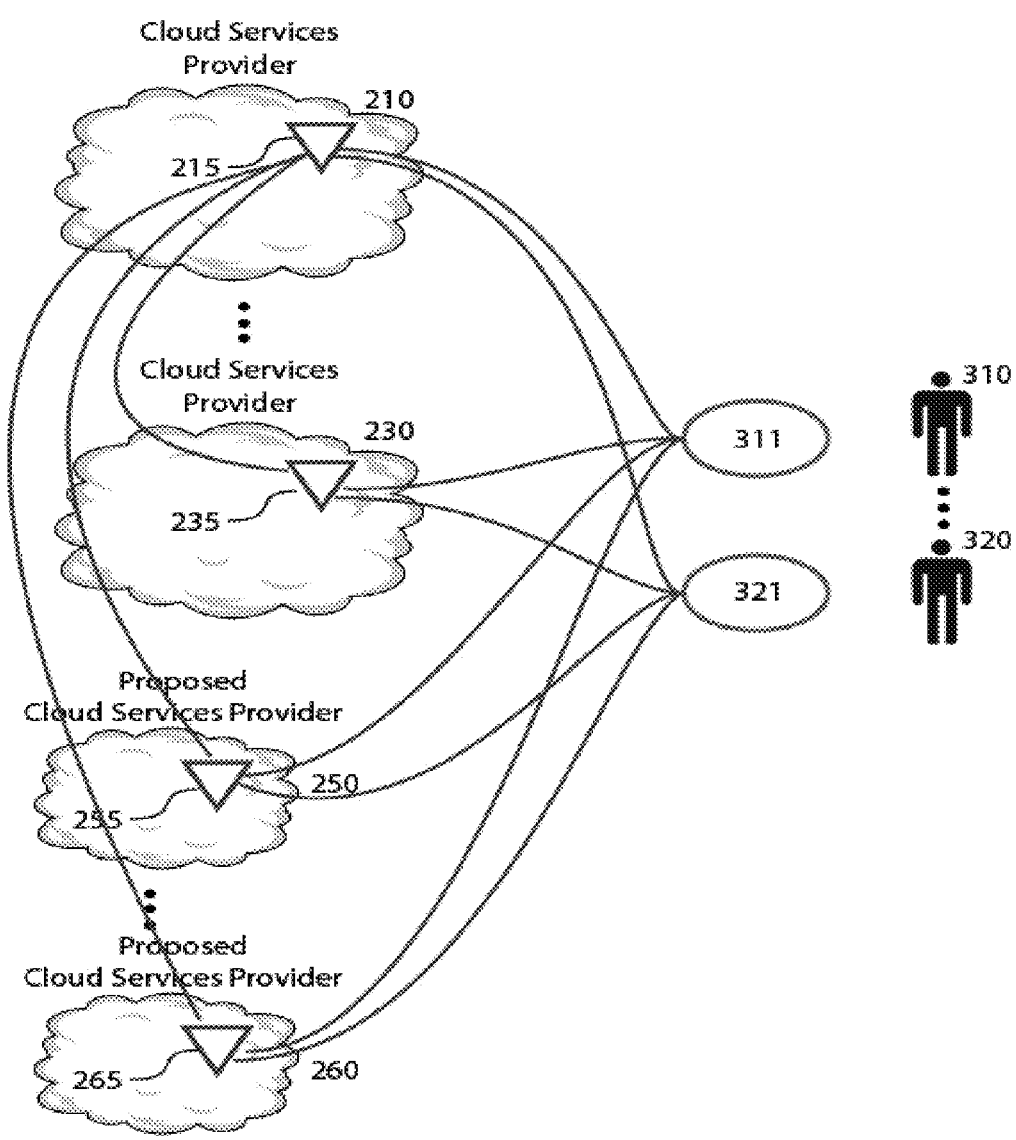
FIG. 5 is a diagram depicting the processing of Netgraphy agents or services, according to an embodiment of the invention.

FIG. 5 is a diagram depicting the processing of Netgraphy agents or services, according to an embodiment of the invention. The Netgraphy agents or services are implemented in non-transitory computer-readable or processor-readable storage medium as instructions that are executed on one or more processors of a network and the processors are specifically configured to perform the processing of the Netgraphy agents.

The Netgraphy agents shown at 215, 235, 255, and 265, are running in the associated cloud services provider at 210, 230, 250, and 260 respectively. It is noted that the Netgraphy agents' measure: responsiveness, number of hops, error rate, costs, etc. in a manner that will provide the information needed to create the Netgraphy map. This may involve an N×N evaluation of all connections, such as is shown in the FIG. 5 between 215 and 235, 255, and 265. Of course, if all of the connections were shown for this N×N evaluation there would also be the connections between e.g., 235 and 215, 255, 265, etc. The planning module at 120 will have the information necessary to plan that the type of testing that needs to take place so that testing strategies more advantageous than an N×N can be contrived.

In an embodiment, the invention provides also for endpoints shown at 310 and 320 have processes shown as 311 and 321 respectively to provide Netgraphy metrics between endpoints and cloud services Netgraphy agents. This type of testing provides the responsiveness from endpoints outside of the cloud and will be of import for the planning necessary to assure service-level agreement compliance. Traditionally, providing such an agent as 311 and 321 as a user endpoint is problematic. However, there are many endpoint agents available today that could profitably be used such as e.g., Digital Subscriber Line (DSL) Reports and search client, such as is provided by Google. So, in addition to specialized Netgraphy agents, existing utilities, such as was stated before could be used to provide the network traffic necessary for the Netgraphy agent to measure response time for accessing an endpoint.

In an embodiment, the Netgraphy agents at 311 and 321 are triggered by an external mechanism so that testing is performed when the user is not utilizing the equipment hosting the Netgraphy agent. In another embodiment, the Netgraphy agent runs in the background. In still another embodiment, the Netgraphy agent runs of a part of another service such as DSL Reports or a search engine client. If the Netgraphy agent is able to be connected with something as prevalent as a search engine then the information gleaned by the Netgraphy agents concerning endpoint responsiveness will be valuable indeed because of the many tens of thousands and hundreds of thousands of measurements at unique locations that can be acquired.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method stored as executable instructions within a non-transitory computer-readable storage medium that is executed by one or more processors of a network to perform the method, comprising:
   acquiring a state for a cloud processing environment having been tested with test data, the state representing an association between geographical data for the cloud processing environment, attribute data for the cloud processing environment, and previously obtained metric usage data acquired from testing the cloud processing environment via the test data;
   mining news feeds for natural event data and political event data, and assigning a code for each natural event and for each political event mined, and mapping each code to a specific event type and a specific policy, each policy defining automated actions to perform based on the specific event type;
   updating the state with the natural event data and the political event data linked to the geographical data from the mining of the news feeds, the natural event data and the political event data are also linked with particular resources of the cloud processing environment and a geographical location for the geographical data based on the actions defined in a given policy that drives relationships among the political event data, the natural event data, the geographical location, and the particular resources; and
   using the updated state to make real-time decisions for services associated with the cloud processing environment.

2. The method of claim 1 further comprising, detouring one or more of the services from the cloud processing environment to another cloud processing environment in response to the updated state and based on the natural event data and/or the political event data.

3. The method of claim 1 further comprising:
   determining a principal associated with a particular service has paid for guaranteed and dedicated access to one or more of the services of the cloud processing environment;
   evaluating the updated state to determine that in response to the natural event data and/or political event data the one or more services may be compromised; and
   automatically routing the one or more services to a new cloud processing environment to continue to guarantee the dedicated access to the one or more services.

4. The method of claim 1 further comprising:
   determining that a policy of an entity included in the political event data is in conflict with a predefined profile of a principal associated with the services; and
   rerouting the services to a new cloud processing environment that is in accord with the predefined profile of the principal.

5. The method of claim 1 further comprising:
   determining that a declaration included with the natural event data of the updated state poses a risk that congestion or a level of service is to be disrupted; and
   rerouting the services to a new cloud processing environment that does not include the risk.

6. The method of claim 1 further comprising:
   determining that the natural event data and/or the political event data of the updated state pose risks that have not yet been realized; and
   generating one or more second cloud processing environments to handle the services as alternatives to the cloud processing environment in the event that one or more of the risks are subsequently realized.

7. The method of claim 1 further comprising:
   permitting an authorized principal to dynamically make additions or changes to the natural event data and/or political event data; and
   updating the state of the cloud processing environment in response to the additions or changes.

8. The method of claim 1, wherein updating further includes establishing a relationship between a first entry in the natural event data and a second entry in the political event data.

9. The method of claim 8, wherein establishing further includes determining that the first entry does not alter the state but that the second entry obtained via the relationship does alter the state.

10. The method of claim 1, wherein updating further includes, identifying that some entries in both the natural event data and the political event data: are specific to just the cloud computing environment and its resources; are specific to a geographic location or region of the resources, or are specific to both the cloud computing environment and the geographic location or region.

11. A method stored as executable instructions within a non-transitory computer-readable storage medium that is executed by one or more processors of a network to perform the method, comprising:
  configuring a natural event repository to house descriptive details regarding physical events beyond human control along with natural event policies for actions to take in response to the descriptive details;
  configuring a political event repository to house statements regarding affairs of entities or governments along with political event policies for action to take in response to the statements;
  selectively linking natural event entries in the natural event repository to political event entries in the political event repository; and
  providing access to the natural event repository and the political event repository to make dynamic decisions on selections of cloud computing environments for handling services of a principal, the natural event entries and political event entries linked to specific resources of the cloud computing environments and linked to specific geographical locations based on relationships defined in the natural event policies and the political event policies.

12. The method of claim 11 further comprising, populating some of the natural event entries and some of the political event entries via automated mining of news repositories.

13. The method of claim 11 further comprising, populating some of the natural event entries and some of the political event entries via manual instruction received from an authorized principal.

14. The method of claim 11, wherein selectively linking further includes generating at least one or more natural event entries that link to: a specific political event entry or that links to two or more political event entries; or generating at least one or more political event entries that link to: a specific natural event entry or that links to two or more natural event entries.

15. The method of claim 11, wherein selectively linking further includes generating the linking in response to a policy evaluation.

16. A multiprocessor-implemented system, comprising:
  a cloud deployment manager implemented in a non-transitory computer-readable storage medium and to execute on one or more processors of a network;
  a natural event repository implemented in a non-transitory computer-readable storage medium and accessed by one or more processors of the network; and
  a political event repository implemented in a non-transitory computer-readable storage medium and accessed by one or more processors of the network;
  the cloud deployment manager is configured to evaluate entries in the natural event repository and the political event repository to update a state associated with a target cloud processing environment, the cloud deployment manager is further configured to reroute services from the target cloud processing environment to an alternative cloud processing environment in response to the evaluation of the entries, natural event data and political event data are linked with particular resources of the target cloud processing environment and a geographical location based on relationships defined in policies.

17. The system of claim 16, wherein the entries in the natural event repository include descriptions of geographical events that are outside the control of humans, each entry in the natural event repository associated with its own policy for performing some recommended action.

18. The system of claim 16, wherein the entries in the political event repository include statements of entities or governments, each entry in the political event repository associated with its own policy for performing some recommended action.

19. The system of claim 16, wherein at least some entries in the natural event repository and/or some of the political event entries include time stamp information describing: when specific events happened or are expected to happen, and/or how long the specific events lasted or are expected to last.

* * * * *

UNITED STATES PATENT AND TRADEMARK OFFICE
CERTIFICATE OF CORRECTION

| | | |
|---|---|---|
| PATENT NO. | : 8,554,885 B2 | Page 1 of 1 |
| APPLICATION NO. | : 12/872293 | |
| DATED | : October 8, 2013 | |
| INVENTOR(S) | : Isaacson et al. | |

It is certified that error appears in the above-identified patent and that said Letters Patent is hereby corrected as shown below:

In the Claims

In column 14, line 8, in claim 16, delete "anon-transitory" and insert --a non-transitory--, therefor Signed and Sealed this
Tenth Day of December, 2013

Margaret A. Focarino
*Commissioner for Patents of the United States Patent and Trademark Office*